Figure 1:
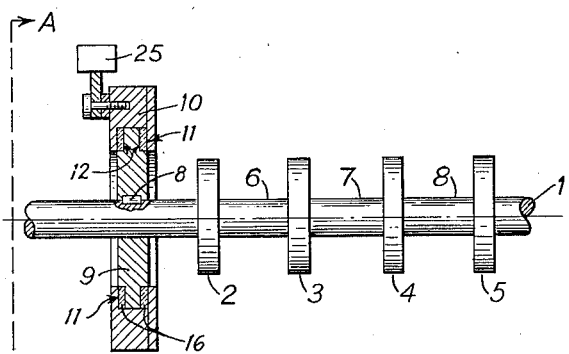

Oct. 19, 1948.    F. M. M. B. SALOMON    2,451,513
OSCILLATION REDUCING DEVICE
Original Filed Aug. 16, 1939

INVENTOR.
Francois M. M. B. Salomon
BY
F. Bascom Smith
ATTORNEY

Patented Oct. 19, 1948

2,451,513

UNITED STATES PATENT OFFICE 2,451,513

OSCILLATION REDUCING DEVICE

Francois Marie Michel Bernard Salomon, Paris, France; vested in the Attorney General of the United States of America Original application August 16, 1939, Serial No. 290,433. Divided and this application May 25, 1945, Serial No. 595,838. In France August 17, 1938

9 Claims. (Cl. 74—574)

This invention relates to apparatus for reducing oscillations or vibrations in machine parts, or the like, and more particularly to vibration reducing means adapted for operation in conjunction with a rotating shaft or the like.

This application is a division of my copending application Serial No. 290,433 filed August 16, 1939, for Oscillation reducing device, which matured into Patent No. 2,383,516, and all subject matter in said prior filed application which is applicable to the disclosure of the present application is incorporated herein by reference.

For reducing the vibrations of machine shafts, others have heretofore used devices which employ movable auxiliary masses that may be of the most varied shapes, such as flywheels or plates which are centered or not centered on the shaft, centrifugal masses that are independent or centered on the shaft or the like, the movements of said masses being furthermore damped by various means. This damping may be obtained, for example, by the friction of solid surfaces on solid surfaces, by using fluids or even by other means such as electrical means. On the other hand, springs or various resilient substances that may even be fluid may furthermore be used either for providing elastic couplings on the shafts or for producing retracting moments on the auxiliary oscillating masses. Systems of the above character will be hereinafter referred to as "systems of the first type."

A second type of device has also been used for reducing speed oscillations and vibrations, said devices being particularly applicable to machine shafts and being characterized by the use of auxiliary masses which are completely free on their guideways, involve very slight friction, and are subjected solely to the action of the distributing forces and to the retractng action of the centrifugal forces. The natural periods of oscillation of a centrifugal mass in a device of the second type is preferably tuned to the periodic disturbing forces to be compensated and may in particular be equal to it.

The present invention has for one of its objects the provision of combinations of the systems of the two types mentioned above, it being understood, of course, that the novel system comprehended does not involve a simple juxtaposition of said types but a real combination thereof as will be seen hereinafter.

The technical advantage of this combination is a question of species and it may happen that the systems of the second type with as little friction as possible on the auxiliary masses are preferable to the "combined" systems. In certain cases, however, the systems of the second type with free masses may per se possess properties which vary too quickly with their constructional peculiarities so that very small differences in such peculiarities which may, for example, be due to possible errors in machining completely modify the properties of the oscillation reducer. In such cases, it is advantageous to use the devices which are the object of the present invention wherein the action of the devices of the first type (involving frictional damping devices and optionally the use of springs or resilient substances) enables the acuteness of the characteristic curves of the complete system to be reduced. Under these conditions given differences in the constructional features may be of less importance. In particular, a greater variation in the natural period of a centrifugal pendulum of the second type may become acceptable without substantially altering the properties of the whole arrangement.

It must be carefully noted that the fact that the above combination may be advantageous in certain cases does not in any way change the technical importance of the systems of the second type having free centrifugal masses. Although said systems of the second type may in some instances be very advantageous in combination with systems of the first type, it may be more advantageous in other instances to use one of said systems alone.

Figure 2:
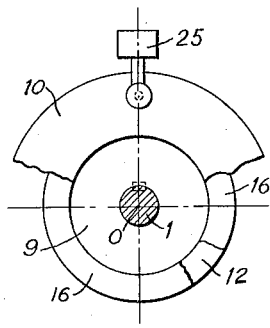
Figure 3:
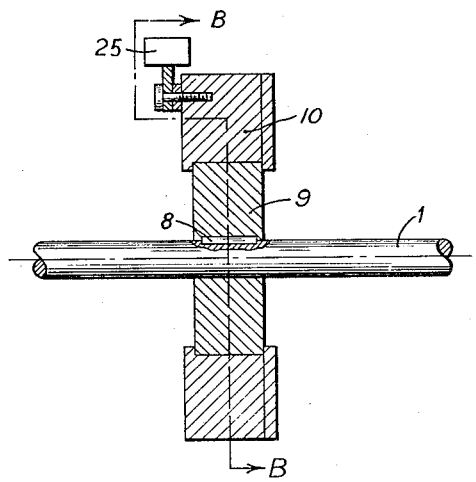
Figure 4:
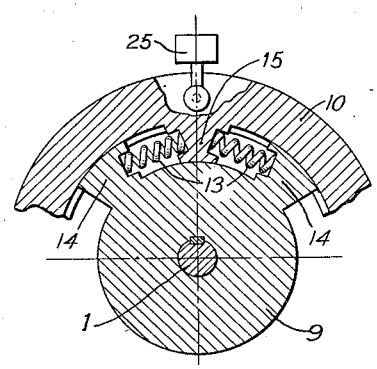

Other advantages and peculiarities of the invention will become apparent from the ensuing description when the same is taken in conjunction with the accompanying drawings which diagrammatically show, merely by way of example, two embodiments of the invention. In the drawings, wherein like reference characters refer to like parts through the several views, Fig. 1 is a diagrammatic side elevation, partly in section and with parts broken away, showing one embodiment of a device embodying the present invention and fitted on a crankshaft of a straight four-cylinder heat engine;

Fig. 2 is a detail end elevation, partly in section and with parts broken away, of the device illustrated in Fig. 1, the view being taken substantially on line A—A of Fig. 1; and, Figs. 3 and 4 are views similar to Figs. 1 and 2, respectively, showing a second embodiment of the invention, the section of Fig. 4 being taken substantially on line B—B of Fig. 3.

Referring to Figs. 1 and 2, the invention is illustrated in conjunction with a rotatable shaft 1 having an axis 0. The numerals 2, 3, 4 and 5 represent the moments of inertia equivalent to the movable parts of the four cylinders of an engine embodying shaft 1 as a crankshaft and the numerals 6, 7 and 8 represent the elasticities which are equivalent to the corresponding fractions of the shaft.

A plate 9 is secured on shaft 1 for rotation therewith by means of a key 8, or other suitable means. A ring 10 is centered on plate 9 for movement relative thereto. The relative movement of plate 9 and ring 10 may be resisted by a certain amount of friction between the surfaces 11 of member 10 and the surfaces 12 of plate 9. These various surfaces may, in particular, be coated with plastic or fibrous substances indicated by the numeral 16. In fact, the arrangement of the members 9 and 10 does not differ in principle from the damping devices of the type known by the name of Lanchaster and like devices.

It has been shown, particularly in Salomon U. S. Patents Nos. 2,029,796, 2,103,643 and 2,181,610 that by mounting suitably constructed centrifugal pendulums on a rotating member such as member 9, it is possible to considerably increase in absolute value, relative to a given harmonic, the magnitude of the apparent moment of inertia of said rotatable member. Said patents also disclose that, by suitably constructing the centrifugal pendulums, it is possible to give the rotating member, relatively to a given harmonic, a finite or infinite positive or negative apparent moment of inertia, the value of which is appropriate to each case of application. More particularly, the pendular masses which are mounted on the rotating member move absolutely freely without damping and without being retracted by means of a spring, the sole retracting action being that of the centrifugal forces. The property or functioning of such a device is independent of the speed of rotation of the shaft. Additionally, the aforesaid patents disclose the conditions which must be fulfilled from a constructional standpoint as regards the natural period of the centrifugal pendulums.

As best shown in Fig. 4, the "coupling" between the ring or disc member 10 and plate 9 may be effected by means of a resilient device that has been shown diagrammatically in the form of springs 13. This resiliency could also be obtained in other ways, such as by using any resilient substances including natural or synthetic rubber fluids, or the like. It would be possible, for example, to couple the members 9 and 10 by means of pumps in accordance with any arrangement and, in particular, by arrangements which are already known per se.

As shown in Fig. 4, the disc 9 is provided with radially projecting shoulders 14 and the ring 10 carries feet 15 projecting radially inward between shoulders 14. The springs 13 are interposed between shoulders 14 and feet 15 so as to resist angular movement of ring 10 in either direction relative to member 9.

In the embodiment of Fig. 1 as well as in the embodiment of Fig. 3, a centrifugal pendulum or damping mass 25 is diagrammatically shown as being pivotally mounted on ring 10. It will be understood, of course, that the centrifugal damping mass or pendulum may take the form of any known type of damping mass and, more particularly, the types illustrated in the above-mentioned patents.

Each of the devices illustrated in the drawings comprises a first member 10 coupled to an oscillating member 9 by resilient or damping parts and a system of oscillating masses mounted on member 10 which are not subjected to resilient or damping actions but solely to the retracting action of the centrifugal forces. Furthermore, member 10 is concentric with rotary shaft 1 and is not subjected to the retracting action of the centrifugal forces.

It is known that in the damping devices, of the first type, of which the system formed by the plate 9 and the ring 10 which are coupled by friction is a diagrammatical example, there is in practice in each case an optimum value for the moment of inertia of the member 10 relatively to the axis of shaft 1.

Let M be this value.

It has been shown on the other hand that the systems of oscillating centrifugal masses described in the above-mentioned patents are equivalent to a finite or infinite positive or negative fictitious inertia, the value of which is $$\frac{\Delta}{\delta}$$

$\Delta$ and $\delta$ being certain determinants of the order $n$ plus 1 and $n$, respectively, relatively to the linear equations which are satisfied by the system within the usual approximations, and $n$ being the number of stages of the pendular system. According to the present invention, the pendular systems of the second type, such as the one which is diagrammatically represented in the illustrated embodiments by the pendulum 25, are "tuned" in such a manner that $$\frac{\Delta}{\delta}=M$$

The devices which are the object of the present invention may be placed at any points of the vibrating members and in the case of shafts, the same may be placed at the front, at the rear, or intermediate the ends. In the case of crankshafts, said devices can be placed in the counterweights or outside the shaft. In the case of radial aircraft engines, said devices can be mounted in the counterweights. The pendulums used may be of any type with unifilar, bifilar or multifilar suspension. The shaft which produces the centrifugal forces will frequently be the shaft or machine part in which it is desired to reduce the vibrations, but it could be another shaft which could be kept in rotation in any manner, such as by means of an electric motor or the like.

There may be any number of stages of oscillating rolling masses when systems according to the present invention are used. It is also possible to use multiple pendulum systems having as high a degree of freedom as desired without exceeding the scope of the present invention. Finally, without exceeding the scope of the present invention, the oscillating systems coupled to members 9 and 10 may also be provided with springs or resilient substances to act as abutments or stops during reductions of speed or to perform a complementary function.

The object of the present invention is not limited to the case of rotary shafts and may be extended to any members of machines, in which event the rotary shaft 1 may be driven by any method whatsoever.

What is claimed is:

1. In apparatus of the class described, a rotatable machine member having a guideway concentric with the axis of rotation thereof, a damping mass mounted on said member for angular movement relative thereto on said guideway, yieldable means for resisting relative movement of said mass and member, and at least one pendular damping mass carried by said first-named damping mass.

2. In combination, a rotatable member having a curved guideway thereon concentric with the axis of rotation thereof, an oscillatable damping mass movable along said guideway, means for yieldably resisting oscillation of said mass relative to said member, and at least one pendular damping mass carried by said first-named damping mass.

3. In apparatus of the class described, a rotatable member, an annular damping mass operatively connected with said member and surrounding the axis of rotation thereof, said mass being adapted to oscillate relative to said member about said axis as a center, said oscillatory movement of said mass being resisted by frictional engagement between said member and mass, and at least one pendular damping mass carried by said first-named damping mass.

4. In combination, a rotatable member, a damping mass mounted on said member for movement relative thereto in a path concentric with the axis of rotation of said member, friction means for resisting relative movement of said mass and member, and at least one pendular damping mass carried by said first-named damping mass.

5. In combination, a rotatable member, a damping mass operatively connected with said member for oscillatory movement relative thereto along a path concentric with the axis of rotation of said member, means for yieldably resisting said oscillatory movement of said mass, and at least one centrifugally responsive damping mass carried by and oscillatable relative to said first-named damping mass.

6. In combination, a rotatable member, a damping mass operatively connected with said member for oscillatory movement relative thereto along a path concentric with the axis of rotation of said member, means for yieldably resisting said oscillatory movement of said mass, and at least one pendular damping mass carried by said first-named damping mass.

7. In combination, a rotatable member, a damping mass operatively connected with said member for oscillatory movement relative thereto along a path concentric with the axis of rotation of said member, means for yieldably resisting said oscillatory movement of said mass, and at least one damping mass pivotally mounted on said first-named damping mass, the pivot for said second-named mass being eccentric with respect to said axis.

8. In combination, a rotatable member, a damping mass mounted on said member for oscillatory movement relative thereto, the oscillatory movement of said mass being substantially unaffected by centrifugal forces acting on said mass, means for yieldably resisting said oscillatory movement of said mass, and at least one centrifugally responsive damping mass carried by said first-named damping mass.

9. In combination, a rotatable member, a damping mass mounted for oscillatory movement relative to said member along a path concentric with the axis of rotation of said member, resilient means for resisting oscillatory movement of said mass relative to said member, and at least one centrifugally responsive damping mass carried by and oscillatable relative to said first-named damping mass.

FRANCOIS MARIE MICHEL
BERNARD SALOMON.

REFERENCES CITED

The following references are of record in the file of this patent:

UNITED STATES PATENTS

| Number | Name | Date |
|---|---|---|
| 707,389 | Churchward | Aug. 19, 1902 |
| 989,958 | Frahm | Apr. 18, 1911 |
| 2,155,052 | Byland | Apr. 18, 1939 |
| 2,211,076 | Sarazin | Aug. 13, 1940 |
| 2,383,516 | Salomon | Aug. 28, 1945 |